(12) United States Patent
Bodet et al.

(10) Patent No.: US 9,403,635 B2
(45) Date of Patent: Aug. 2, 2016

(54) RING FOR FASTENING A POUCH IN A BOTTLE

(71) Applicant: LINDAL FRANCE SAS, Briey (FR)

(72) Inventors: Hervé Bodet, Verdun (FR); Jérôme Peltier, Briey (FR)

(73) Assignee: LINDAL FRANCE SAS, Briey (FR)

( * ) Notice: Subject to any disclaimer, the term of this patent is extended or adjusted under 35 U.S.C. 154(b) by 0 days.

(21) Appl. No.: 14/382,960

(22) PCT Filed: Mar. 4, 2013

(86) PCT No.: PCT/EP2013/054255
§ 371 (c)(1),
(2) Date: Sep. 4, 2014

(87) PCT Pub. No.: WO2013/131846
PCT Pub. Date: Sep. 12, 2013

(65) Prior Publication Data
US 2015/0014990 A1      Jan. 15, 2015

(30) Foreign Application Priority Data

Mar. 5, 2012  (FR) ..................... 12 51971

(51) Int. Cl.
*B65D 35/28*           (2006.01)
*B65D 83/38*           (2006.01)
(Continued)

(52) U.S. Cl.
CPC .............. *B65D 83/38* (2013.01); *B65D 83/32* (2013.01); *B65D 83/42* (2013.01); *B65D 83/48* (2013.01); *B65D 83/62* (2013.01); *F16L 23/04* (2013.01); *Y10T 29/49826* (2015.01)

(58) Field of Classification Search
CPC ........ B65D 83/62; B65D 83/38; B65D 83/32; B65D 83/42; B65D 83/48; F16L 23/04; Y10T 29/49826
USPC ................. 222/402.1, 402.24, 462.2, 189.1, 222/105–107, 386.5
See application file for complete search history.

(56) References Cited

U.S. PATENT DOCUMENTS 3,549,050 A * 12/1970 Bruce ................... B65D 83/62
                                                    222/402.22
3,896,970 A *  7/1975 Laauwe ................. B65D 83/62
                                                    222/94

(Continued)

FOREIGN PATENT DOCUMENTS

EP     0776834 A1    6/1997
EP     1966064 A1    9/2008

(Continued)

OTHER PUBLICATIONS

International Search Report dated Apr. 19, 2013, issued in corresponding application No. PCT/EP2013/054255.

*Primary Examiner* — Lien Ngo
(74) *Attorney, Agent, or Firm* — Westerman, Hattori, Daniels & Adrian, LLP (57) ABSTRACT

A fastening ring (1) for fastening a pouch (2) in a container (4) made up of a bottle (42, 43) provided with an upper opening closeable by extraction means (3) optionally mounted on a cup (5), an upper tubular portion, preferably cylindrical, provided at its upper end with an outwardly projecting flange dimensioned to bear against the upper opening of a bottle and to be clamped between the upper opening of the bottle and the outer edge of extraction means or the outer edge of a cup (5) equipped with the extraction means (3) during packaging of the container, a tenon positioned in the extension of the upper tubular portion, on the side opposed to the flange, for fastening anti-collapse means (6) or an immersion tube, and a portion for fastening the pouch (2), which portion can be formed by the tubular portion.

19 Claims, 7 Drawing Sheets

(51) Int. Cl.

*B65D 83/32* (2006.01)
*B65D 83/42* (2006.01)
*B65D 83/48* (2006.01)
*B65D 83/62* (2006.01)
*F16L 23/04* (2006.01)

(56) References Cited

U.S. PATENT DOCUMENTS

| | | | | |
|---|---|---|---|---|
| 4,062,475 A | * | 12/1977 | Harris | B65D 83/32 222/192 |
| 4,148,416 A | | 4/1979 | Gunn-Smith | |
| 4,949,871 A | | 8/1990 | Flanner | |
| 4,953,753 A | * | 9/1990 | Gortz | B65D 83/0061 222/105 |
| 5,273,191 A | * | 12/1993 | Meshberg | B05B 11/0018 222/105 |
| 5,343,901 A | * | 9/1994 | Meshberg | B05B 11/0037 141/18 |
| 5,730,328 A | * | 3/1998 | Maeder | B65D 83/62 222/464.2 |
| 6,375,046 B1 | * | 4/2002 | Alleard | B65D 83/62 141/20 |
| 6,505,986 B1 | | 1/2003 | Oder | |
| 6,712,241 B1 | | 3/2004 | Garcia et al. | |
| 7,111,763 B2 | * | 9/2006 | Masuda | B05B 11/0013 222/105 |
| 8,292,121 B2 | * | 10/2012 | Davideit | B65D 83/425 222/105 |
| 2006/0049205 A1 | | 3/2006 | Green | |
| 2006/0113319 A1 | | 6/2006 | Smith | |
| 2008/0314475 A1 | | 12/2008 | Fransen | |
| 2010/0108716 A1 | | 5/2010 | Bilko | |
| 2012/0024419 A1 | * | 2/2012 | Behar | B65B 3/16 141/1 |
| 2012/0292338 A1 | | 11/2012 | Smith | |

FOREIGN PATENT DOCUMENTS

| | | |
|---|---|---|
| GB | 2420554 A | 5/2006 |
| WO | 00/63093 A1 | 10/2000 |
| WO | 02/16224 A1 | 2/2002 |
| WO | 2007/077003 A1 | 7/2007 |
| WO | 2008/110600 A1 | 9/2008 |
| WO | 2012/158741 A2 | 11/2012 |

\* cited by examiner

RING FOR FASTENING A POUCH IN A BOTTLE

The invention relates to a fastening ring for fastening a pouch in a container made up of a bottle provided with an upper opening closable by extraction means optionally mounted on a cup.

In pressurized bottles, it is common to place the product to be extracted in a flexible pouch placed inside a housing. In most cases, the pouch is fastened directly to the valve body. Document EP 1 966 064 A1 can be mentioned as an example. In this case, the product must be introduced into the pouch by passing through the valve. Since the passageway is narrow, a high pressure is required and the filling time is relatively long.

In some cases, however, the valve is not designed to receive a pouch. This is the case with high flow valves, for example.

In this case, the pouch is fastened directly to the housing, at the junction between the cup carrying the extraction means and the neck of the bottle.

Further, when the pouches are being emptied, they sometimes curl in on themselves, forming isolated areas that no longer have access to the valve. The product cannot get out of these remote areas, as a result of which the restitution rate is reduced. Several solutions have been proposed, which can be grouped into two categories: radial anti-collapse means and longitudinal anti-collapse means. Radial anti-collapse means accompany the vertical retraction of the pouch while preventing it from retracting radially. These radial anti-collapse means include, in particular, spring elements of large diameter and with largely spaced coils, as in document WO 2008/110600 A1. In U.S. Pat. No. 4,062,475, the spring is formed by the immersion tube which is coiled in the shape of a spring. When the pouch is being emptied, its bottom rises toward the valve, accompanied by the spring which is progressively deformed as the pouch is being emptied under the effect of the propellant gas. However, the pouch cannot collapse radially beyond the diameter of the spring. Even when completely squashed, the spring still has a certain height, so that a significant dead volume remains in the empty pouch.

Longitudinal anti-collapse means allow the pouch to deform radially toward the central axis of the housing, while substantially maintaining its height deployment. They include immersion tubes open at their lower end and fastened by their upper end to the valve body. In an improved version known from U.S. Pat. No. 4,148,416, the tube is provided with vertical grooves and/or openings distributed over part or the totality of the tube. Thus, when the pouch is being progressively emptied, it can collapse toward the immersion tube, but it cannot rise toward the valve. If isolated areas are formed, they are still in contact with the valve via the openings distributed over the whole height of the immersion tube or the grooves leading to the opening at the lower opening of the immersion tube. In one of the examples of document U.S. Pat. No. 4,148,416, the tube is not fastened to the valve, but floats freely in the pouch so that the upper end is located near the valve and the lower end is located near the bottom of the pouch. This tube still serves to facilitate the conveying of the product toward the valve. In this type of anti-collapse means, the dead volume is formed by the tube. Thus, it is smaller than that of the radial anti-collapse means. However, if the pouch comes to stick against the tube, it blocks access to the openings and the effectiveness of the immersion tube is reduced.

All these radial anti-collapse means, when they are fastened, are fastened directly to the valve.

The aim of the invention is to design a ring according to the preamble which allows fastening radial anti-collapse means even when the extraction means do not provide a gripping zone therefor. A second objective is to reduce the risk of forming isolated zones without contact with the extraction means. A third objective is to offer the widest possible passages for the product to enter into the pouch or to leave it.

The first objective is achieved according to the invention in that the ring is provided with an upper tubular portion, preferably cylindrical, provided at its upper end with an outwardly projecting flange dimensioned to bear against the upper opening of a bottle and to be clamped between the upper opening of the bottle and the outer edge of extraction means or the outer edge of a cup equipped with the extraction means during packaging of the container, a tenon placed in the extension of the upper tubular portion on the side opposite to the flange, for fastening anti-collapse means or an immersion tube, and a portion for fastening the pouch around the periphery of the ring, which portion can be formed by the tubular portion.

Thanks to the flange, it is possible to fasten the ring in the crimped assembly of the cup and the bottle. The dimensions of the upper tubular portion are thus independent from the shape of the extraction means or of the cup on which they can be mounted.

With the tenon, it is possible to fasten an immersion tube or anti-collapse means, even if the extraction means do not allow fastening such immersion tube or anti-collapse means.

In principle, the pouch can be fastened directly to the upper tubular portion, however, it can be useful to provide an eyelet between the upper tubular portion and the tenon, in which case the eyelet can constitute the portion for fastening the pouch.

Whether the pouch is fastened directly to the upper tubular portion or to the eyelet, fins can be provided in the portion for fastening the pouch. The fins are arranged opposite one another relative to the central axis of the portion for fastening the pouch. The portion for fastening the pouch then has a transverse cross-section shaped like a boat.

To facilitate access to the portion of the pouch located at the upper end of the tenon, openings can be provided in the lower portion of the fins, at the junction between the portion for fastening the pouch and the tenon, for setting the inside and the outside of the ring in contact with each other.

The upper tubular element can include a radial annular groove dimensioned to allow snapping the ring onto the upper opening of the bottle. This radial groove facilitates maintaining the ring in place during packaging of the container.

In practice, a ring according to the invention can be made up of a first portion, called the cap, whose upper end carries the flange and whose lower end is partially closed by a bottom, which first portion is extended from the bottom by a second portion, called the eyelet, provided on its outer surface with the portion for fastening the pouch and whose transverse cross-section is smaller than the transverse cross-section of the cap, said eyelet being extended opposite to the cap by a third portion, called the tenon, whose transverse cross-section is smaller than the transverse cross-section of the cap, and preferably than that of the eyelet, a central channel passing right through the ring from the flange to the free end of the tenon.

To facilitate entry of the product into the pouch, then its extraction, it is preferable to provide one or more longitudinal slots in the tenon, which slots preferably start at the level of the junction between the portion for fastening the pouch and the tenon, preferably in the extension of the openings located at the lower end of the fins, when fins are present.

To ensure proper fastening of the anti-collapse means on the ring, preferably, the tenon is provided with means for fastening an immersion tube or an anti-collapse device. These fastening means can be designed in particular as a thread formed on the outer face of the tenon. They can also be designed as a shoulder which can take the form of an end ring fastened to the tenon in the extension of the longitudinal slots.

In general, the ring is supplied equipped with a pouch containing an immersion tube or anti-collapse means fastened to the tenon of the ring. The immersion tube or the anti-collapse means have a central channel, one end of which can be provided with means for fastening them to the ring so that the central channel, in the state mounted in a bottle, is in contact with the inside of the ring and the extraction means.

In a first embodiment, the anti-collapse means are formed by a helical spring having coils spaced from each other so as to form a helical slot all along the spring, setting the inside of the central channel formed by the spring and the outside of the spring in contact with each other, the coils remaining non-contiguous whatever the external constraints to which the spring is subjected during normal usage.

In a second embodiment, the anti-collapse means are formed by a perforated tube provided on at least a portion of its length and a portion of its periphery with perforations which set the inside of the central channel and the outside of the perforated tube in contact with each other, fastening means being preferably provided at one of its ends to fasten it to the tenon of the ring.

The invention also relates to a method for packaging a container made up of a bottle provided with an upper opening closable by extraction means optionally mounted on a cup and of a ring according to the invention.

According to the invention, the method comprises the following steps:
 Welding a pouch on the portion for fastening the pouch, optionally after positioning an immersion tube or anti-collapse means on the tenon of the ring;
 Introducing the ring into the upper opening of the bottle;
 Fastening the extraction means to the upper opening of the bottle and interposing the flange of the ring so as to clamp it in-between.

The product can be introduced into the pouch before fastening the extraction means or via the extraction means after fastening said extraction means.

The invention also relates to a filling head.

The invention is described in more detail below using an exemplary embodiment.

The Figures show.

The invention relates to a ring (1, 8) for fastening a pouch (2) in a bottle (4), in particular a pressurized bottle. According to the invention, the ring is provided with means for fastening an axial anti-collapse element (6, 6', 9), that is to say an element which prevents the pouch, during withdrawal, from curling in too much in a vertical direction. The ring is designed primarily for a high flow valve. However, it can also be used with any other extraction means such as low flow valves, or in unpressurized containers equipped with pumps.

Figure 1:
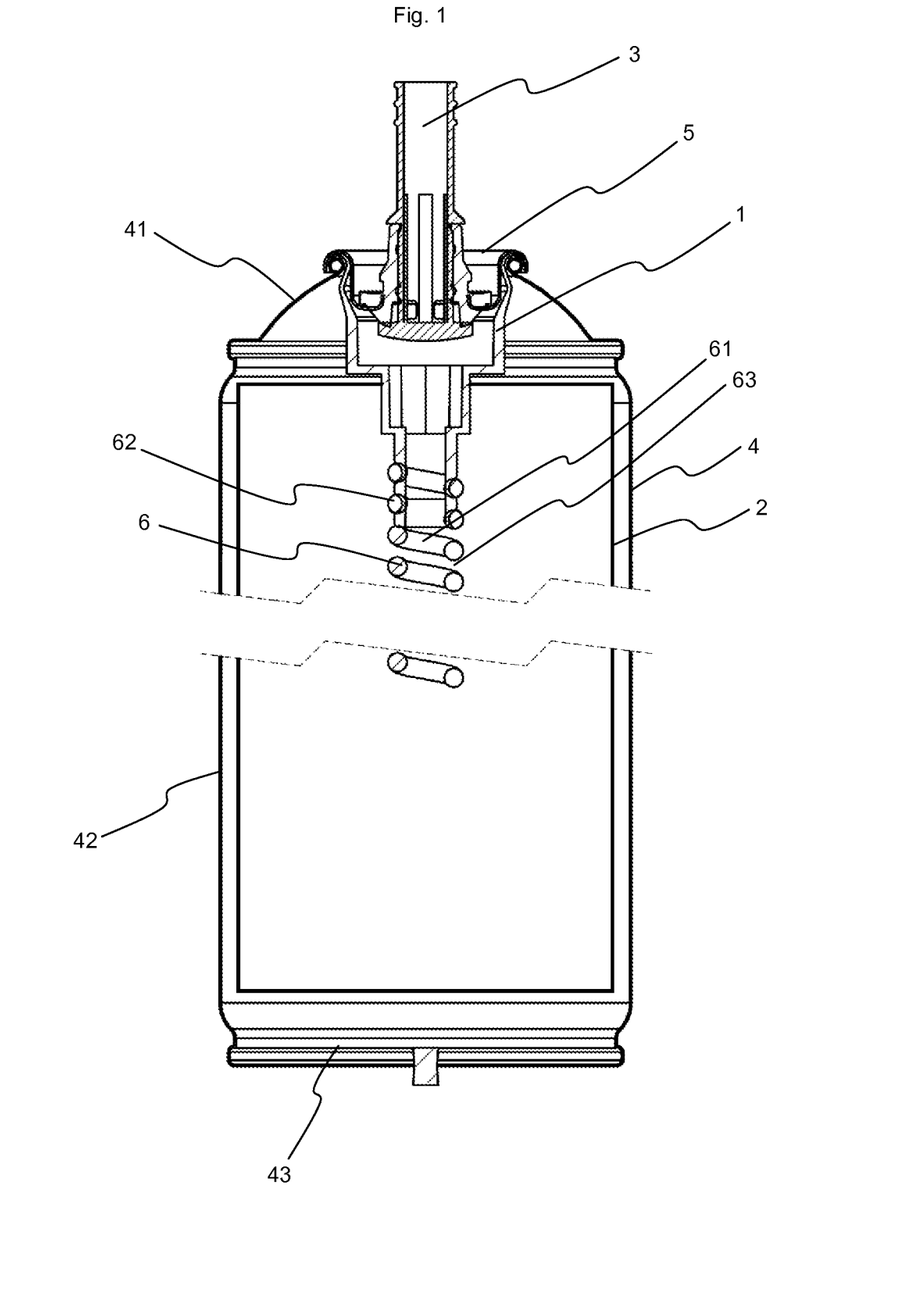
FIG. 1: a cross-sectional view of a bottle provided with a ring according to a first embodiment and an anti-collapse spring.
Figure 2:
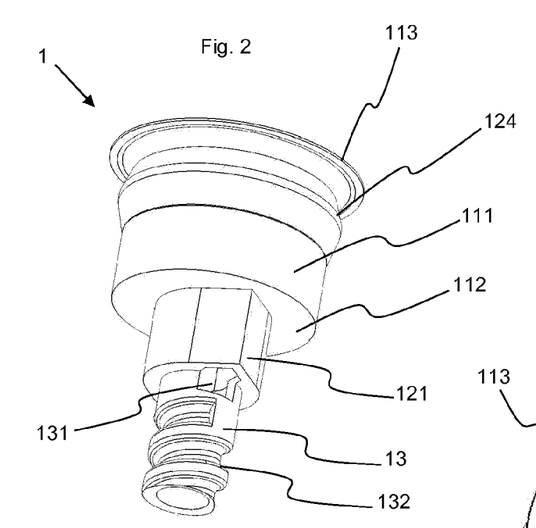
FIG. 2: a bottom perspective view of the ring of FIG. 1.
Figure 3:
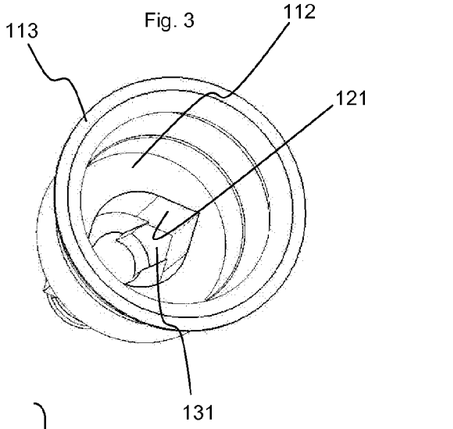
FIG. 3: a top perspective view of the ring of FIG. 1.
Figure 4:
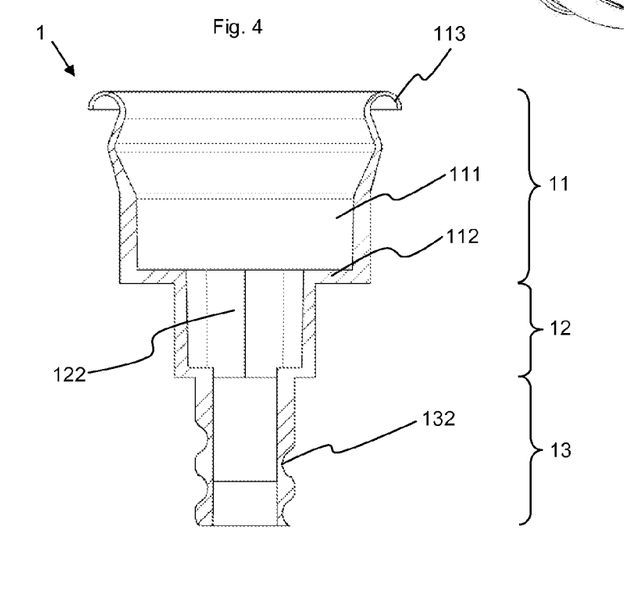
FIG. 4: a cross-sectional view through the ring of FIG. 1.
Figures 16, 17, 18:
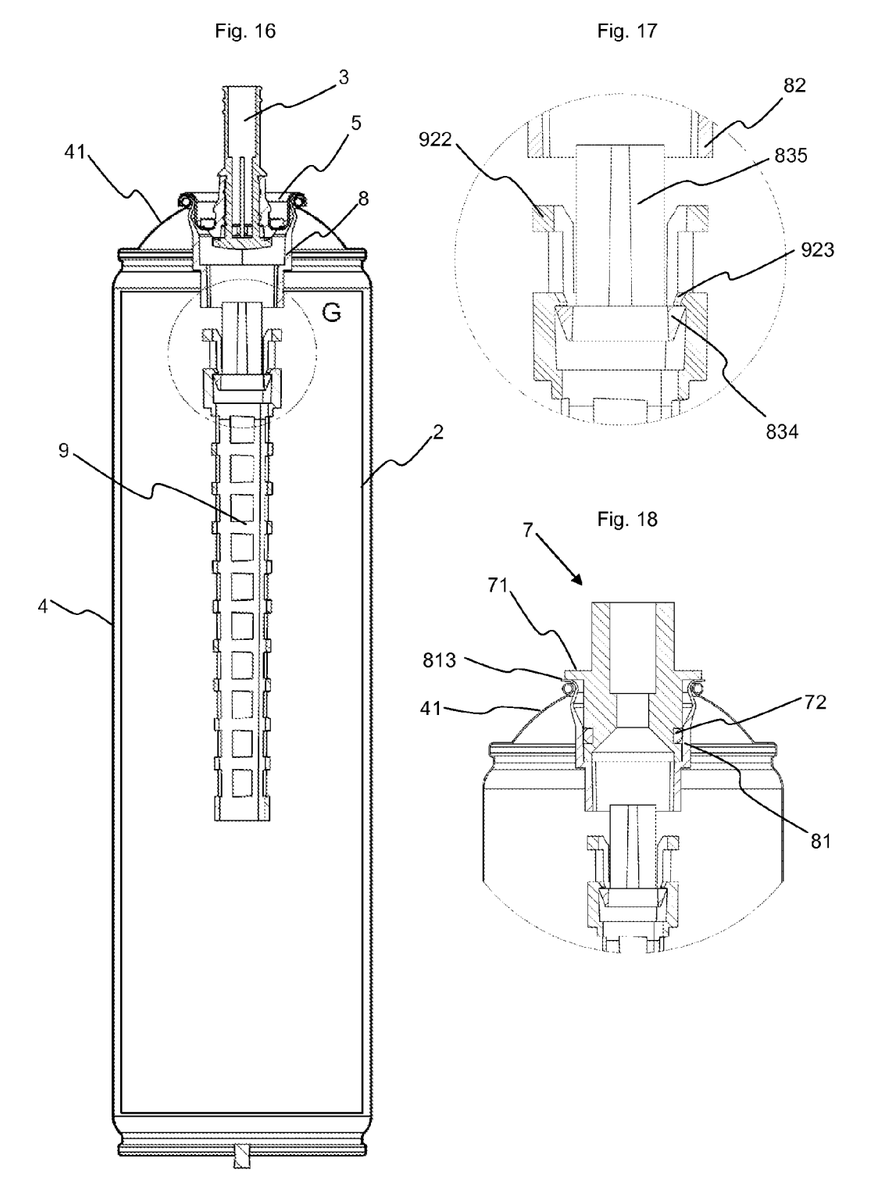
FIG. 16: a side view of the bottle of FIG. 8.
FIG. 17: the enlarged zone G of FIG. 16.
FIG. 18: a view of the bottle during filling.

The pouch (2), which is shown schematically in FIGS. 1 and 16, is used to separate the product to be kept from the propellant gas contained in the space between the pouch (2) and the housing (4). The pouch is made from a flexible sealed material. It is usually manufactured by superimposing two layers that are welded together at their circumference, leaving an opening for providing a passage for the ring (1, 8) on which it is welded.

The housing (4) presented here is made up of a dome (41) provided with the opening for fastening the cap (5), a substantially cylindrical central portion (42), and a bottom (43). The dome (41) and the bottom (43) are crimped to the respective ends of the cylindrical portion (42). The opening in the dome (41) forms the neck of the housing. It is formed by a rolled edge. Of course, any other type of bottle can be suitable as long as it has an opening adapted to cooperate with the means for fastening the extraction means.

The high flow valve (3) presented in FIGS. 1, 5, 8 and 16 is made up of a rigid stem (31) contained in a flexible sleeve called grommet (32). The grommet has on its outer face a slit having a radial portion in which the inner edge of the cup (5) penetrates, ensuring, on the one hand, the connection valve/cup, and on the other hand, the seal between the inside and the outside of the cup. The stem (31) is made of a rigid material, such as polypropylene (PP), high density polyethylene (HDPE), or polyethylene (PE), which can be in the natural state or loaded with glass fibers, for example. The grommet (32) is made of an elastic material. The stem is made up of a tubular portion closed at its lower end by a bottom (311) that projects radially outwardly beyond the general diameter of the tubular portion. This projecting edge bears against the lower face of the grommet (32). Several openings (312) are formed in the lower end of the tubular portion, directly above the bottom, thereby setting the inside of the tubular part and the outside of the stem in contact with each other. To open the valve, the stem must be pushed down. The grommet (32) deforms and the protruding edge at the lower end of the stem leaves the lower face of the grommet. In this way, the four openings are freed and the product can flow through the valve, passing over the protruding edge, through the openings, up along the tubular portion of the stem, and out through the upper end of the stem.

Figure 5:
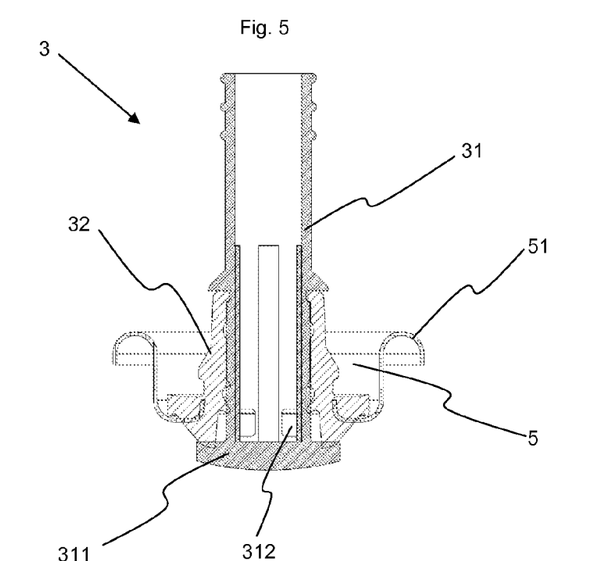
FIG. 5: a cross-sectional view through a high flow valve mounted on a cup.

As can be seen, it is not possible to fasten a pouch or anti-collapse element on this type of valve, because of the lack of a protruding element on which to fasten them.

It is therefore necessary to use a fastening ring. In exemplary embodiments, the ring (1, 8) is essentially made up of a portion called cap (11, 81), a portion called eyelet (12, 82), and a tenon (13, 83) for fastening the anti-collapse means (6, 6', 9).

The cap (11, 81) is made up mainly of a cylindrical central portion (111, 811) open at the upper end and partially closed at the lower end by a bottom (112, 812). The upper edge of the cylindrical portion (111, 811) projects outwardly, forming a flange (113, 813). The eyelet (12, 82) is arranged on the lower face of the bottom (112, 812). This eyelet is a tubular member open at both ends. It is connected by its upper portion to the bottom (112, 812) so that it opens into the cap (11, 81).

The pouch (2) is shown schematically in FIGS. 1 and 16. It is fastened, preferably by welding, to the outside face of the eyelet (12, 82). To facilitate this fastening and to ensure a high resistance thereof, two vertical and pointed fins (121, 821) were placed on the outer surface of the eyelet, disposed opposite one another. These fins give the eyelet a transverse cross-section (that is to say, in the horizontal plane) in the shape of boat. It should be understood thereby that the cross-section is substantially in the shape of a diamond whose angles at the ends of the short diagonal are rounded and obtuse, while the angles at the ends of the long diagonal are acute and pointed. The boat shape is more pronounced in the ring (1) of the first embodiment than in the ring (8) of the second embodiment. The plane of the pouch to be welded is aligned with the plane passing through the ends of two fins (121, 821) so that the junction between the welding of the two films of the pouch and the welding of the pouch films on the eyelet (12, 82) is performed at an angle that is as flat as possible (as seen from each film of the pouch). To save material, the transverse cross-section of the central channel at the level of the eyelet (12, 82) has the same boat-shaped cross-section as the outer cross-section of the eyelet. However, it would have been possible to give a circular shape to the transverse cross section of the channel (122, 822) at the level of the fins.

In principle, it would be possible to fasten the pouch (2) directly to the outer face of the cylindrical part (111, 811) of the cap (11, 81). In this case, it is not necessary to provide the eyelet (12, 82). In this configuration, it is preferable to provide the outside face of the cap with fins that stop preferably before the flange (113, 813). The interest of the eyelet (12, 82) is to move the fastening zone of the pouch downwards. This is preferable in cases like the one presented here because of the presence of the dome (41). If the pouch is rectangular, as is the case here, its deployment would be hampered by the dome. Thanks to the cap and eyelet, the fastening zone is moved lower and is located at the level of the cylindrical portion (42) of the housing. If a pouch that tapers upward or a container without a dome is provided, the fastening zone of the pouch on the ring can be moved higher, and the fins can be provided directly on the cap (11, 81).

Furthermore, if the pouch is not obtained by welding two films to each other, but by blowing, for example, the opening of the pouch intended to be fastened to the ring is no longer flat, but circular. In this case, the presence of the fins (121, 821) is no longer necessary, either on the eyelet (12, 82) or on the cap (11, 81).

Experience has shown that when the pouch is being emptied, it is at risk of collapsing upon itself, forming recesses isolated from the remainder of the pouch and from the outlet opening of the extraction means. The product contained in these isolated areas cannot get out, as a result of which the restitution rate is reduced. Accordingly, anti-collapse means can be provided inside the pouch.

To fasten anti-collapse means (6, 6'), a tenon (13, 83) is provided on the fastening ring (1, 8) in the extension of the eyelet (12, 82). This tenon makes it possible to fasten, either an immersion tube, or anti-collapse means. This tenon (13, 83) is open at both ends so that its upper end opens into the inside of the eyelet, at the level of the lower end thereof. When the tenon (13, 83) is used for fastening anti-collapse means, it is preferable to provide one or more openings (131, 831) at the junction between the eyelet (12, 82) and the tenon (13, 83) to allow the product located around the tenon to enter the ring. When the ring is not provided with an eyelet, the tenon is fastened in the extension of the cylindrical portion (11, 81) and the openings can be provided at the junction between the cylindrical portion and the tenon. In the examples presented here, the openings (131, 831) are formed in the lower portion of the fins (121, 821), at the level of the junction between the eyelet (12, 82) and the tenon (13, 83).

As is visible, the ring is thus crossed from side to side by a central channel which opens on one side at the level of the flange and on the other side at the lower end of the tenon.

In order to facilitate packaging of the bottle, the cylindrical portion (111, 811) of the ring is provided in its upper portion, slightly below the flange (113, 813), with a radial groove (114, 814) whose bottom has a diameter greater than the diameter of the remainder of the cylindrical portion. This radial groove (114, 814) is intended to make it possible to snap the ring (1, 8) on the bottle neck during its insertion, as is visible in FIGS. 1 and 8, for example. It also facilitates swaging of the cup carrying the valve on the housing.

If the product contained in the pouch (2) is particularly thick, as is the case with dough for churros, for example, then one or more longitudinal slots (833) formed in the tenon (83) can be provided, instead of, or in addition to, the openings (131, 831). These slots can extend from the junction between the tenon (83) and the eyelet (82) over a certain length on the tenon. In the case shown in FIGS. 8 to 17, these slots, two in number, extend along substantially the entire height of the tenon and end at the level of an end ring (834). This end ring is thus fastened to the ring by two walls (835) that are offset by 90° relative to the fins (121, 821). The two longitudinal slots (833) are located in the extension of the openings (831).

The longitudinal anti-collapse means (6, 6', 9), and an immersion tube, have a central channel (61, 61', 91), one end (62, 62', 62) of which is provided with means for fastening it to the ring so that the central channel of the anti-collapse means, in the state mounted in a bottle, is in contact with the extraction means (2).

Figure 12:
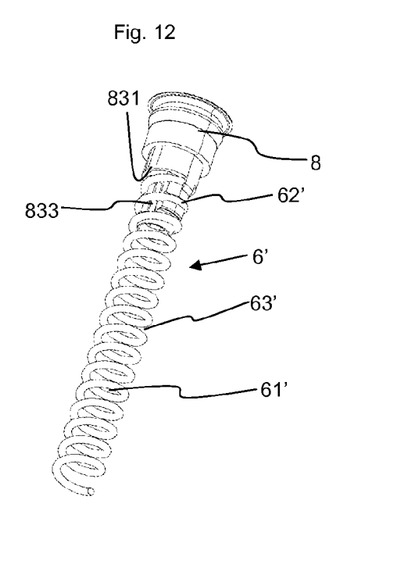
FIG. 12: a perspective view of the ring of FIG. 8 provided with an anti-collapse spring.

In the example of FIGS. 1 and 12, the anti-collapse means are formed by a spring (6, 6') fastened to the fastening ring (1, 8). The spring (6, 6') is made from metal or plastic, for example. Whatever the external constraints, its coils are not contiguous. Thus, a long, continuous helical passage (63, 63') is formed all along the spring, which passage extends over the entire length of the spring and sets the inside of the pouch (2) in contact with the central channel (61, 61') of the spring, which is thus accessible from all sides. For fastening of the spring (6, 6'), a thread (132, 832) can be provided on the tenon (13, 83) to allow screwing the upper portion (62, 62') of the spring (6, 6'). In the case of the second ring, the thread (832) is formed on the walls (835) of the tenon and the upper coils of the spring (6') pass over the longitudinal slots (833). They prevent the pouch from entering the inside of the ring by passing through the longitudinal slots. They do not, however, interfere with the flow of product through the longitudinal slots.

Figure 13:
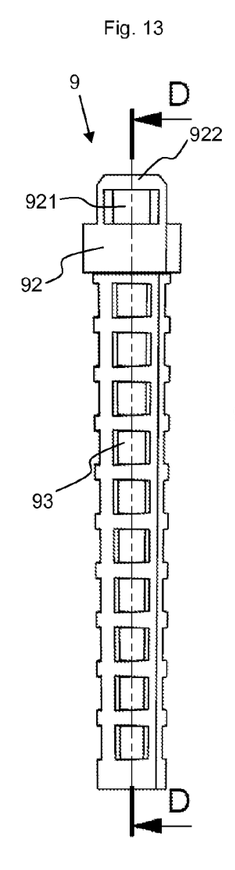
FIG. 13: a front view of the anti-collapse tube of FIG. 8.
Figure 14:
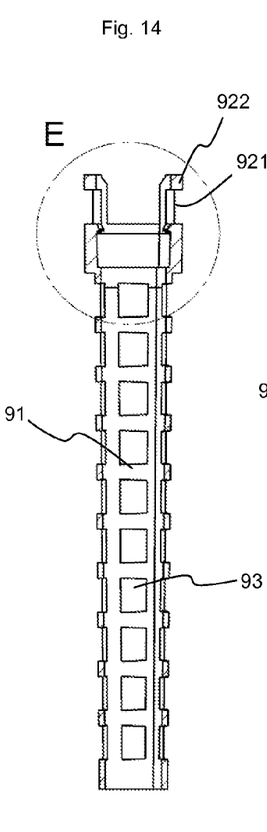
FIG. 14: a cross-sectional view of the tube along line DD of FIG. 13.
Figure 15:
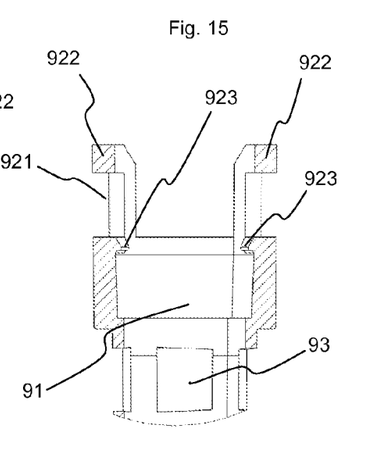
FIG. 15: the enlarged zone E of FIG. 14.

Another solution is to use a perforated tube (9), as shown in particular in FIGS. 13-15. This tube is traversed at its center by a central channel (91) pierced along its entire length and its entire periphery by perforations (93). Only the upper portion intended for fastening it to the ring is free of perforations. The perforated tube (9) is particularly adapted to the ring (8) of the second embodiment. It is provided in its upper portion (92) with two windows (921) which are fitted into the longitudinal slots (833) of the tenon (83) of the ring (2). These windows have a function of, on the one hand, aligning the tube on the ring (8) during assembly, and on the other hand, thanks to their upper transverse bars (922), preventing the pouch (2) from entering the slots. The two windows also provide lateral support for the tube on the tenon. They do not impede passage of the product via the longitudinal slots (833). Two shoulders (923) are also provided in the lower portion of the windows (921) to snap behind the end ring (834) of the tenon which acts as a shoulder complementary to the shoulders (923) of the tube. This time, the anti-collapse means are not screwed on the tenon, but snapped thereon.

The length of the spring (6, 6') or of the tube (9) is chosen as a function of the length of the pouch (2) in which they are to be used. They should be long enough to prevent the pouch from curling in and isolated areas from being created. The spring, and with it the helical slot, or the tube and its perforations, extend over a large portion of the height of the pouch. Thanks to the anti-collapse means, the pouch is held substantially straight during the entire life of the bottle, thus preventing the formation of isolated areas that could not be emptied. Even if, in some areas, the pouch comes to stick against the spring (6, 6') or the tube (9), the helical slot or perforations remain open everywhere else. The risk that the slot or all of the perforations could be completely blocked by the pouch sticking against them is practically nil. Note that in FIGS. 1 and 16, the dimensions chosen for the anti-collapse means (6, 6', 9) and the pouch (2) are only an example.

The anti-collapse means (6, 6', 9) can be fastened, not only to the fastening ring like the one shown here, but also directly to the housing (4) or to a valve or a pump equipped with a tenon for fastening an immersion tube or a traditional anti-collapse means.

The ring (1, 8) is used as follows. The pouch (2) is fastened by any appropriate means to the fastening zone of the ring (1, 8) which can have been previously provided with anti-collapse means or with an immersion tube. In general, the ring is fastened to the pouch by welding. It is then preferable to roll or fold the pouch on itself and hold it in this position with retaining means, such as adhesive strips. These retaining means are designed to yield easily when filling the pouch. In general, weak areas are provided, such as cutouts in dotted lines. This ring/pouch unit or ring/pouch/anti-collapse means or immersion tube unit forms a part manufactured at a first site. This part is usually delivered to the bottling plant in the same way as the bottle or the valve on its cup.

During bottling, the pouch and the ring, optionally provided with anti-collapse means, are introduced into the housing so that the flange (113, 813) of the ring bears against the neck of the housing (4), here, the rolled edge of the opening of the dome (41), and so that the annular groove (114, 814) passes below the neck of the housing (4) and snaps the ring on the housing. The product is then poured through the ring (1, 8) into the pouch (2) that unfolds after the retaining means have given way under the pressure of the incoming product. FIG. 18 illustrates this step. The filling head (7) is introduced into the central channel (122, 822) at the level of the cylindrical portion (11, 81). The filling head has two distinct sealing means: a radial flange (71) which firmly presses the flange (113, 813) of the ring (1, 8) against the neck of the housing (4) and a gasket (72) which is pressed against the inner face of the cylindrical member (11). The squashing of the flange (113, 813) of the ring against the neck of the bottle by the filling head (7) ensures, not only sealing vis-à-vis the outside, but also holding in place of the ring (1, 8), which is thus not at risk of sliding into the container during filling. The product enters the pouch via the distribution channel (73). The product flows from this distribution channel (73) into the central channel (122, 822) of the cylindrical portion, the eyelet (12, 82), and the tenon (31, 83) and then into the pouch via the openings (131, 831) at the eyelet/tenon junction, the longitudinal slots (833) located in the tenon, when they are provided, the helical slot (63, 63') of the spring or the perforations (93) of the perforated tube.

Figure 6A:
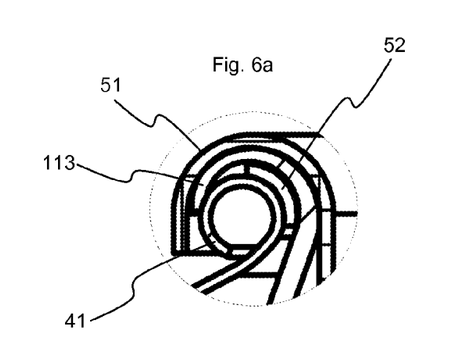
FIG. 6: an enlarged view of the junction between the cup and the housing after interposition of a ring according to the invention a) with a gasket and b) without a gasket.

When filling is finished, the extraction means, here the valve (3) mounted on the cup (5), are put in place with their outer edge (51) placed on the rolled edge of the dome (41). The flange (113, 813) of the ring is thus sandwiched between the rolled edge of the opening of the dome and the outer edge shaped as a groove (51) of the cup. The cup (5) is set on the dome by crimping, thus blocking the flange (113, 813). Crimping the flange between the dome (41) and the cup (5) ensures a sealed separation between the inside of the pouch (2) and the space reserved to the gas between the pouch and the housing (4). In some cases, a gasket (52) can be provided, for example, in the bottom of the crimping groove (51) of the cup or between the dome (41) and the underside of the flange (113), which is the solution selected on FIG. 6a.

The gas is introduced through the bottom (43) of the housing in a known manner. It is also possible to introduce the gas before or after filling the product by passing under the flange (113, 813).

It is of course also possible to fill the fully assembled bottle via the valve when the product allows it.

The ring of the invention (1, 8) can be used, not only with valves which by design do not allow fastening a pouch, as is the case for the high flow valve shown here, but also with valves which in principle would allow fastening the pouch directly to the valve body. This allows filling of the pouch via the ring (1, 8) rather than via the valve. Since the diameter of the filling passage is substantially larger, filling is easier and quicker.

Figure 6B:
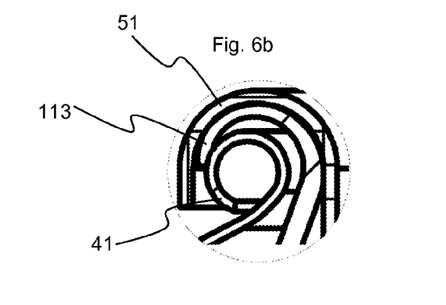
Figure 7:
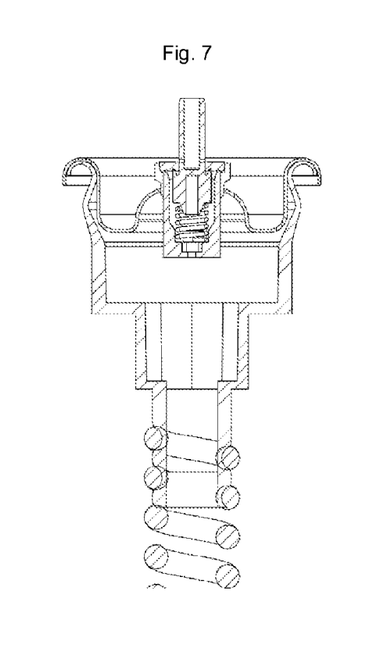
FIG. 7: a cross-sectional view of the ring of FIG. 1 provided with an anti-collapse spring and a low flow valve.
Figure 8:
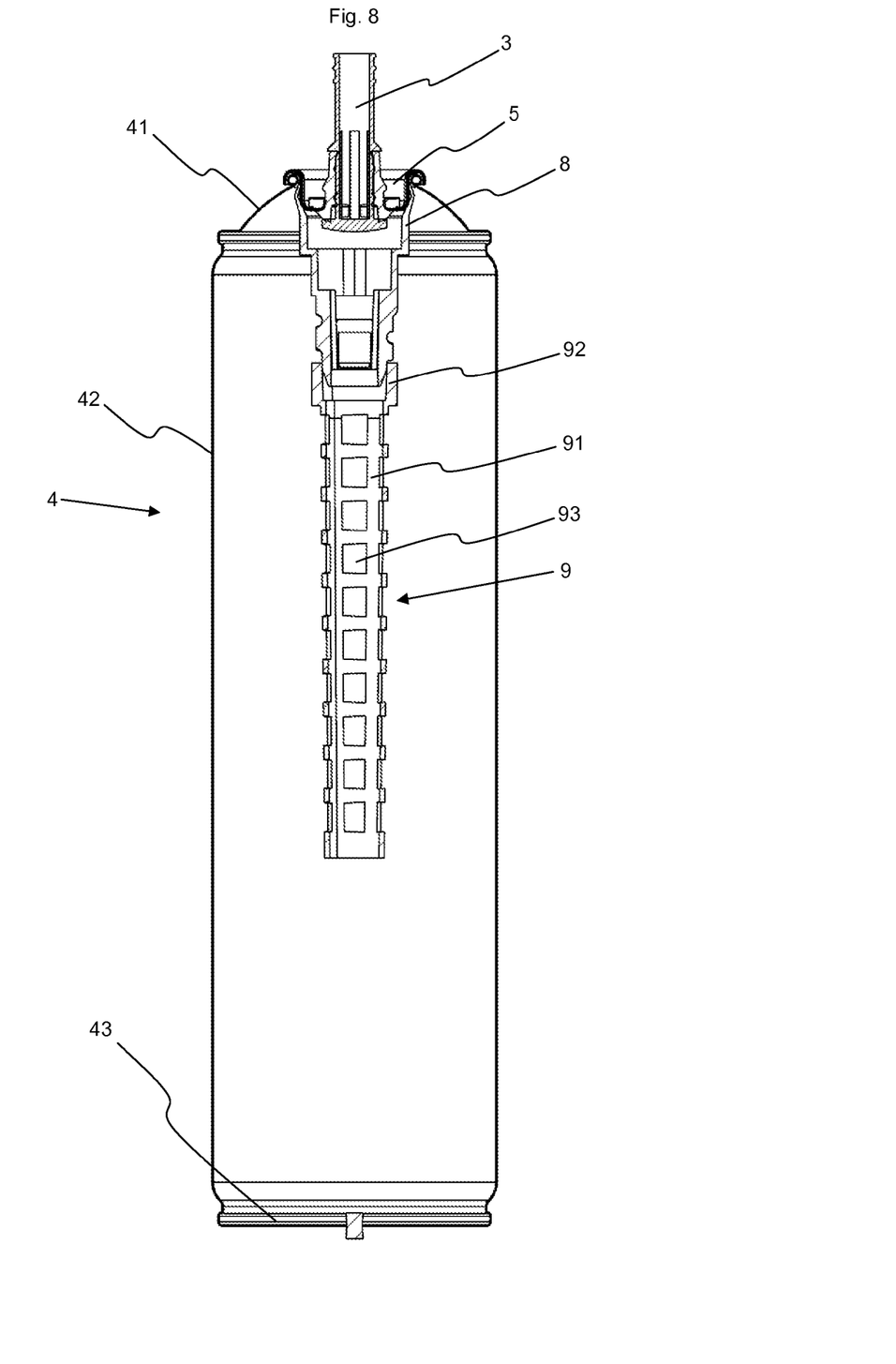
FIG. 8: a cross-sectional view of a bottle provided with a ring according to a second embodiment and an anti-collapse tube.
Figure 9:
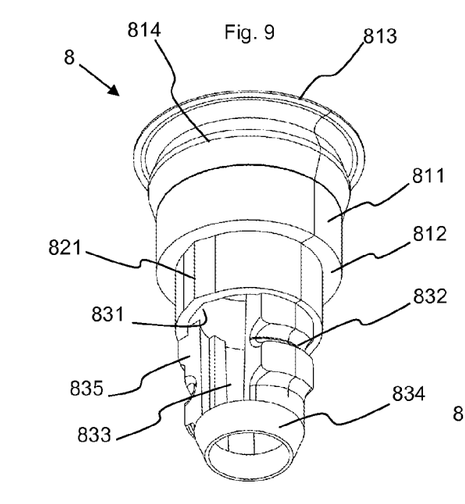
FIG. 9: a bottom perspective view of the ring of FIG. 8.
Figure 10:
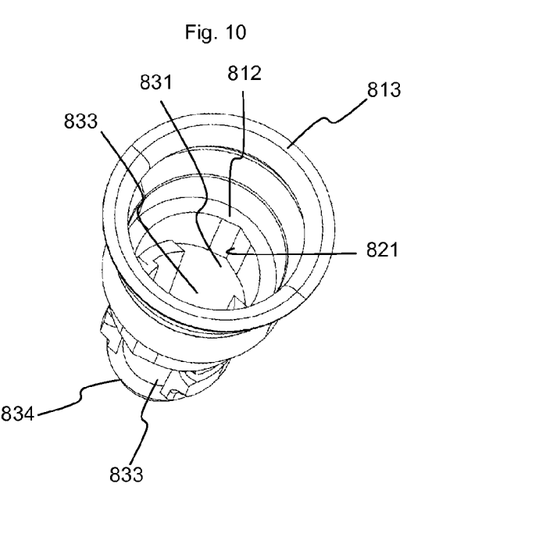
FIG. 10: a top perspective view of the ring of FIG. 8.
Figure 11:
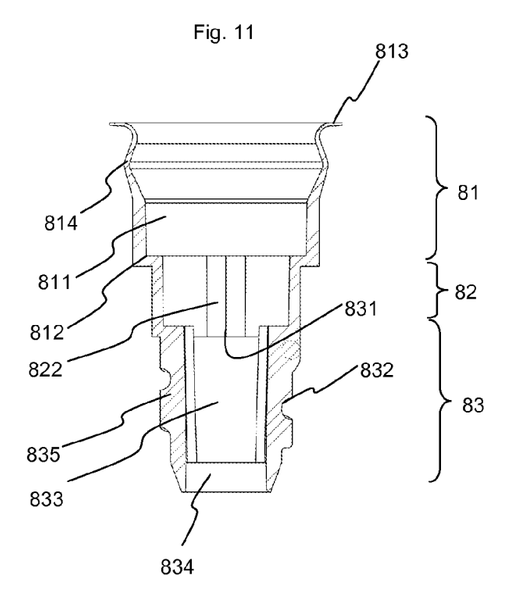
FIG. 11: a cross-sectional view through the ring of FIG. 8.

As shown in FIGS. 6a and 6b, the ring is not fastened to the cup. In other words, it is not necessary to form the cap (11, 81) as a function of the cup. Only the diameter of the flange should be compatible with that of the neck of the housing and the fastening means of the cup. This diameter is often normalized so that a few models having different diameters are sufficient to cover most of the needs, without it being necessary to adapt the dimensions and shape of the cap to those of the cup.

It will be observed in the figures that the upper portion (111, 811) of the cap (11, 81), called "cylindrical portion," can have another shape, and in particular, it can have a frusto-conical shape. Those skilled in the art understand that it is possible to obtain the same result by providing a radial groove in a frusto-conical wall whose diameter decreases towards the bottom. It is also possible to generalize the "cylindrical portion" by "upper tubular portion."

The ring is preferably made of HDPE (high density polyethylene). Other materials are also suitable, such as LDPE (low density polyethylene), PP (polypropylene), PET (polyethylene terephthalate), POM (polyoxymethylene), etc.

| List of references: | |
|---|---|
| 1 | 1$^{st}$ fastening ring |
| 11 | Cap |
| 111 | Upper/cylindrical portion |
| 112 | Bottom |

| List of references: | |
|---|---|
| 113 | Flange |
| 114 | Radial groove |
| 12 | Eyelet |
| 121 | Fins |
| 122 | Central channel |
| 13 | Tenon |
| 131 | Openings |
| 132 | Thread |
| 2 | Pouch |
| 3 | Extraction means (high flow valve) |
| 31 | Stem |
| 311 | Stem bottom |
| 312 | Openings |
| 32 | Grommet |
| 4 | Housing |
| 41 | Dome |
| 42 | Cylindrical portion |
| 43 | Bottom |
| 5 | Cup |
| 51 | Crimping groove |
| 52 | Gasket |
| 6 | Anti-collapse means (spring) |
| 61 | Central channel of the anti-collapse means |
| 62 | End for fastening the anti-collapse means |
| 63 | Helical slot in the space between coils |
| 7 | Filling head |
| 71 | Radial flange |
| 72 | Gasket |
| 73 | Distribution channel |
| 8 | $2^{nd}$ fastening ring |
| 81 | Cap |
| 811 | Upper/cylindrical portion |
| 812 | Bottom |
| 813 | Flange |
| 814 | Radial groove |
| 82 | Eyelet |
| 821 | Fins |
| 822 | Central channel |
| 83 | Tenon |
| 831 | Openings |
| 832 | Thread |
| 833 | Longitudinal slots |
| 834 | End ring |
| 835 | Walls |
| 9 | Anti-collapse means (perforated tube) |
| 91 | Central channel of the anti-collapse means |
| 92 | End for fastening the anti-collapse means |
| 921 | Windows |
| 922 | Upper bars of the windows |
| 923 | Shoulders |
| 93 | Perforations in the tube |

The invention claimed is:

1. Fastening ring for fastening a pouch in a container made up of a bottle provided with an upper opening closeable by extraction means optionally mounted on a cup, wherein the ring is provided with
    an upper tubular portion provided at its upper end with an outwardly projecting flange dimensioned to bear against the upper opening of a bottle and to be clamped between the upper opening of the bottle and the outer edge of extraction means or the outer edge of a cup equipped with the extraction means during packaging of the container,
    a tenon positioned in the extension of the upper tubular portion, on the side opposite to the flange, for fastening anti-collapse means or an immersion tube, and
    a portion for fastening the pouch,
    wherein the ring comprises a first portion, called cap, comprising the upper tubular portion, an upper end of the cap carrying the flange and a lower end of the cap being partially closed by a bottom, the first portion being extended from the bottom by a second portion, called eyelet, an outer surface of the eyelet being provided with the portion for fastening the pouch and a transverse cross-section of the eyelet being smaller than a transverse cross-section of the cap, the eyelet being extended opposite to the cap by the tenon forming a third portion, a transverse cross-section of the tenon being smaller than the transverse cross-section of the cap,
    wherein a central channel passes right through the ring from the flange to a free end of the tenon, and
    wherein at least one lateral opening extending from an outside of the ring to the central channel is provided at a junction between the eyelet and the tenon so as to allow entry of a product located around the tenon,
    wherein the at least one lateral opening extends in the form of at least one longitudinal slot provided in the tenon, said at least one longitudinal slot starting at the level of the junction between the portion for fastening the pouch and the tenon, and extending along a peripheral surface of the tenon toward a free end of the tenon.

2. Ring according to claim 1, wherein fins are provided in the portion for fastening the pouch, said fins being disposed opposite one another relative to the central axis of the portion for fastening the pouch.

3. Ring according to claim 2, wherein the at least one opening is provided in a lower portion of the fins, at the junction between the portion for fastening the pouch and the tenon.

4. Ring according to claim 1, wherein the upper tubular member comprises a radial annular groove dimensioned to allow snapping the ring onto the upper opening of the bottle.

5. Ring according to claim 1, wherein the tenon is provided with means for fastening an immersion tube or an anti-collapse device.

6. Ring according to claim 5, wherein the means for fastening an immersion tube or an anti-collapse device are formed by a thread.

7. Ring according to claim 5, wherein the means for fastening an immersion tube or anti-collapse means are formed by a shoulder.

8. Ring according to claim 1, which is provided with an immersion tube or anti-collapse means, the immersion tube or the anti-collapse means having a central channel, one end of which can be provided with means for fastening them to the ring so that the central channel, in the state mounted in a bottle, is in contact with the inside of the ring and the extraction means.

9. Ring according to claim 8, wherein the anti-collapse means are formed by a helical spring having coils spaced from one another so as to form a helical slot all along the spring, setting the inside of the central channel formed by the spring and the outside of the spring in contact with each other, the coils remaining non-contiguous whatever the external constraints to which the spring is subjected during normal use.

10. Ring according to claim 8, wherein the anti-collapse means are formed by a perforated tube provided on at least a portion of its length and a portion of its periphery with perforations which set the inside of the central channel and the outside of the perforated tube in contact with each other.

11. Ring according to claim 1, further comprising a pouch, wherein the pouch is fastened to the ring.

12. A method for packaging a container made up of a bottle provided with an upper opening closable by extraction means optionally mounted on a cup and of a ring according to claim 1, characterized by the following steps:
    Welding a pouch on the portion for fastening the pouch;
    Introducing the ring into the upper opening of the bottle;

Fastening extraction means to the upper opening of the bottle and interposing the flange of the ring so as to clamp it in-between.

13. Method according to claim 12, wherein the product is introduced into the pouch before fastening the extraction means.

14. Method according to claim 12, wherein the product is introduced into the pouch via the extraction means after fastening said extracting means.

15. Method according to claim 12, wherein the pouch is welded on the portion for attaching the pouch after positioning an immersion tube or anti-collapse means on the tenon of the ring.

16. Ring according to claim 1, wherein the transverse cross-section of the tenon is smaller than the transverse cross-section of the eyelet.

17. Ring according to claim 7, wherein the means for fastening an immersion tube or anti-collapse means are formed by an end ring.

18. Ring according to claim 10, wherein, fastening means are provided at one end of the perforated tube to fasten the perforated tube to the tenon of the ring.

19. Ring according to claim 11, wherein the pouch is fastened to the ring by welding.

* * * * *